United States Patent
Tönniessen et al.

(10) Patent No.: US 8,796,377 B2
(45) Date of Patent: Aug. 5, 2014

(54) PRESSURE-SENSITIVE HOT-MELT ADHESIVES ADHERING TO FLEXIBLE SUBSTRATES

(75) Inventors: Holger Tönniessen, Niederzier (DE); Annie Seiler, Düsseldorf (DE); Rainer Rauberger, Düsseldorf (DE); Ralf Grauel, Hilden (DE)

(73) Assignee: Henkel AG & Co. KGAA, Duesseldorf (DE)

( * ) Notice: Subject to any disclaimer, the term of this patent is extended or adjusted under 35 U.S.C. 154(b) by 532 days.

(21) Appl. No.: 12/464,131

(22) Filed: May 12, 2009

(65) Prior Publication Data

US 2009/0270540 A1    Oct. 29, 2009

Related U.S. Application Data

(63) Continuation of application No. PCT/EP2007/059627, filed on Sep. 13, 2007.

(30) Foreign Application Priority Data

Nov. 15, 2006 (DE) .......................... 10 2006 054 196

(51) Int. Cl.
*C08L 53/00* (2006.01)

(52) U.S. Cl.
USPC ........... 524/505; 524/503; 524/296; 524/488; 524/524

(58) Field of Classification Search
USPC .................... 524/296, 505, 503, 488
See application file for complete search history.

(56) References Cited

U.S. PATENT DOCUMENTS

| 4,394,915 | A |   | 7/1983  | Nelson           |         |
|-----------|---|---|---------|------------------|---------|
| 5,120,781 | A |   | 6/1992  | Johnson, Jr.     |         |
| 5,459,193 | A |   | 10/1995 | Anderson et al.  |         |
| 5,741,840 | A |   | 4/1998  | Lindquist et al. |         |
| 5,939,483 | A | * | 8/1999  | Kueppers         | 524/487 |
| 6,034,159 | A |   | 3/2000  | Malcolm          |         |
| 6,184,285 | B1| * | 2/2001  | Hatfield et al.  | 524/505 |
| 6,870,006 | B2|   | 3/2005  | Cavalli et al.   |         |
| 6,872,279 | B1|   | 3/2005  | Kolowrot et al.  |         |
| 7,682,477 | B2|   | 3/2010  | Moeller et al.   |         |

FOREIGN PATENT DOCUMENTS

| CA | 2184743    | A1 | 3/1997  |
|----|------------|----|---------|
| DE | 29513795   | U1 | 2/1996  |
| DE | 19724648   | A1 | 12/1998 |
| EP | 0413137    | A2 | 2/1991  |
| EP | 0451920    | B1 | 7/1999  |
| JP | 62007776   | A  | 1/1987  |
| WO | 2006066127 | A1 | 6/2006  |
| WO | 2006107763 | A2 | 10/2006 |

* cited by examiner

*Primary Examiner* — Peter D Mulcahy
(74) *Attorney, Agent, or Firm* — Sun Hee Lehmann

(57) ABSTRACT

The invention relates to a hot melt pressure sensitive adhesive. The hot melt pressure sensitive adhesive is particularly well suited for flexible substrates such as plastic and paperboard packaging.

15 Claims, No Drawings

PRESSURE-SENSITIVE HOT-MELT ADHESIVES ADHERING TO FLEXIBLE SUBSTRATES

CROSS REFERENCE TO RELATED APPLICATIONS

This application is a continuation of PCT/EP2007/059627 filed Sep. 13, 2007, which claims the benefit of DE 10 2006 054 196.0, filed Nov. 15, 2006, the complete disclosures of which are hereby incorporated by reference in their entirety.

FIELD OF INVENTION

The invention relates to hot melt pressure sensitive adhesives as well as to their manufacture and use. They should adhere well to flexible substrates and enable a visually impeccable bonding of plastics to cardboard packaging.

BACKGROUND

Hot melts are generally understood to be room temperature-solid, water and solvent-free adhesives that are applied from the melt onto the parts to be glued together and after assembly physically set by solidifying on cooling. On cooling, these pressure sensitive adhesives (PSA) remain tacky and adhesive and with a slight contact pressure adhere to virtually all substrates.

Hot melt pressure sensitive adhesives are widely used in industry and are employed for example in the beverage industry and in the packaging industry for labeling, for attaching transport dockets or for the temporary fastening of disposable articles.

Typical hot melt pressure sensitive adhesives are composed of base polymers, tackifying resins, optional plasticizing oils as well as optional additives. Frequently used base polymers are styrene copolymers, for example block copolymers of styrene-isoprene-styrene (SIS), styrene-butadiene-styrene (SBS), styrene-ethylene-butylene-styrene (SEBS) or amorphous poly-α-olefins (APAO).

Hot melt pressure sensitive adhesives based on for example styrene-isoprene-styrene block copolymers are known from EP 0 451 920 B1. The described compositions comprise conventional tackifiers, plasticizing oils as well as conventional additives. A specific combination with other polymers is not described.

U.S. Pat. No. 5,459,193 describes a hot melt adhesive for pressure sensitive formulations in the textile and non-woven segment. This composition is based on special styrene block copolymers. Admittedly, a composition of this type has an unsatisfactory initial adhesion. On substituting a part or the totality of the SEBS polymer by a SIS and/or SBS polymer, the initial adhesion can indeed be increased, but the cohesion is simultaneously reduced.

A disadvantage of the pressure sensitive hot melt adhesives is frequently observed, in that in the adhesion of substrates on plastics, the plasticizing oils tend to migrate into the substrate. In the case when film substrates are adhesively bonded to solid supports, this can lead, after some time, to creases or waves being created in the film. This disrupts the appearance of such adhesive bonds. Moreover, such styrene block copolymers are expensive. Although other cheaper base polymers are known, they are often incompatible, however and less suitable as pressure sensitive adhesives. Precisely then, higher amounts of plasticizer oils have to be employed in order to achieve the pressure sensitive properties.

Starting from this prior art, there resulted the object of providing cost-efficient pressure sensitive adhesives having improved processing and use characteristics and which possess a high initial adhesion of the adhesive bond. Furthermore, a good adhesion, in particular to plastic substrates, should be assured. In addition, the properties that are important for processing the pressure sensitive adhesive should be at least conserved. The appearance of creases in adhesively bonded film substrates should be avoided.

SUMMARY OF THE INVENTION

The inventive solution to this problem is to be found in the claims. It consists essentially of a hot melt pressure sensitive adhesive comprising
1 to 30 wt. % of at least one ethylene-vinyl acetate copolymer with a melting point above 70° C.,
2 to 50 wt. % of at least one styrene block copolymer,
20 to 70 wt. % of a tackifying resin, as well as
5 to 40 wt. % of at least one plasticizer as well as optional additives,
wherein the sum of the constituents should be 100%.

DETAILED DESCRIPTION OF THE INVENTION

Hot melt pressure sensitive adhesives generally comprise elastomers as a component of the adhesive, in particular thermoplastic elastomers. These mostly have a glass transition temperature $T_g$ of less than 0° C. Examples of such polymers are acrylate, polyester-urethane, ethylene-acrylate, butyl rubber; natural rubber; ethylene-propylene copolymers or styrene copolymers, singly or in mixture, wherein the copolymers concern statistical, alternating, graft or block copolymers. For a composition according to the invention, as one component, thermoplastic elastomers are selected from the group of the styrene block polymers, for example styrene and styrene-butadiene copolymers (SBS, SBR), styrene-isoprene copolymers (SIS), styrene-ethylene/butylene copolymers (SEBS), styrene-ethylene/propylene-styrene copolymers (SEPS) or styrene-isoprene-butylene copolymers (SIBS). Such products are known to the person skilled in the art and are commercially available.

The amount of the styrene block copolymer should be between 5 and 50 wt. % of the hot melt pressure sensitive adhesive. In particular, the hot melt pressure sensitive adhesive should comprise SIS or SBS polymers. Particularly preferably, it is possible that mixtures of SBS or SIS polymers with SIBS polymers are comprised. These polymers are highly compatible with each other. In one embodiment, the weight ratio of SIBS to styrene block copolymers should be 1:10 to 2:1, based on the sum of the styrene block copolymers, especially between 1:5 and 1:1.

Ethylene-vinyl acetate copolymers (EVA) are comprised as further inventively required components. Such copolymers are known to the person skilled in the art. They are polymers with a vinyl acetate content of 10 to 40 mol. % based on the sum of the monomers. They can optionally comprise additional comonomers. These polymers are usually crystalline or partially crystalline. They have a melting point above 70° C. (measured by DSC). The amount of EVA polymer should be 1 to 30 wt. %. The ratio EVA: styrene block copolymers should be between 1:50 to 3:1, particularly 1:20 to 1:1. If the amount of EVA is increased then it is possible that the cold adhesion will be negatively influenced.

The inventive hot melt pressure sensitive adhesive comprises at least one tackifying resin as an additional component. The resin affords an additional tackiness. It is added in an amount of 20 to 70 wt. %, preferably 30 to 60 wt. %. In particular this concerns resins with a softening point from 70 to 130° C. (ring and ball method, DIN 52011). For example, they are aromatic, aliphatic or cycloaliphatic hydrocarbon resins, as well as modified or hydrogenated versions thereof. Practical examples are: aliphatic or alicyclic petroleum hydrocarbon resins and hydrogenated derivatives thereof. Additionally employable resins in the context of the invention are for example hydroabietyl alcohol and its esters, especially its esters with aromatic carboxylic acids such as terephthalic acid and phthalic acid; modified natural resins such as resin acids from balsamic resin, tall oil rosin or wood rosin, e.g. completely saponified balsamic resin or alkyl esters of optionally partially hydrogenated colophonium with low softening points, such as e.g. the methyl esters, diethylene glycol esters, glycerine esters and pentaerythritol esters; terpene resins, in particular terpolymers or copolymers of the terpenes, such as styrene-terpenes, α-methylstyrene-terpenes, phenol-modified terpene resins as well as hydrogenated derivatives thereof; acrylic acid copolymers, preferably styrene-acrylic acid copolymers and resins based on functionalized hydrocarbon resins.

It is preferred to employ partially polymerized tall oil rosin, hydrogenated hydrocarbon resins or glycerol colophonium resin esters. The amount should be 20 to 60 wt. %.

Moreover, a composition according to the invention must comprise at least one plasticizer. The plasticizer is used to adjust the viscosity, should provide an improved processability and if needed increase the tack of the mixture. The viscosity of the plasticizer should be between 10 up to 1500 mPas at 25° C., in particular between 100 and 600 mPas (measured according to DIN 1342). The plasticizer is generally comprised in the pressure sensitive hot melt adhesive in a concentration of 5 to 40 wt. %, preferably in a concentration of 10 to 30 wt. %.

Suitable plasticizers are medicinal white oils, naphthenic mineral oils, adipates, polypropylene oligomers, polybutene oligomers, polyisoprene oligomers, hydrogenated polyisoprene and/or polybutadiene oligomers, benzoate esters, vegetal or animal oils and their derivatives, sulfonic acid esters, mono or polyhydric alcohols, polyalkylene glycols having a molecular weight of 200 to 6000 g/mol, such as polypropylene glycol or polybutylene glycol.

In particular, oily plasticizer components are added. The plasticizer component is preferably a liquid at room temperature, for example hydrocarbon oils, polybutene/polyisoprene oligomers, hydrogenated naphthenic oils or vegetal oils.

In a preferred embodiment of the invention, esters are partially comprised as the plasticizer in addition to the oily plasticizers. They are for example liquid polyesters and glycerine esters, such as glycerine diacetate and glycerine triacetate, glycerine tribenzoate, neopentyl glycol dibenzoate, pentaerythritol tetrabenzoate and 1,4-cyclohexanedimethanol dibenzoate. Preferably, plasticizers based on aromatic dicarboxylic acid esters are employed, e.g. the diesters of phthalic acid, isophthalic acid or terephthalic acid. The alcohol moiety of these esters used as plasticizers normally contains 2 to 20 carbon atoms. Exemplary esters of this type are diallyl phthalate, dibutyl phthalate, dicyclohexyl-, dimethylcyclohexyl-, diisoheptyl-, diethylhexyl-, dioctyl-, diisononyl-, diisodecyl phthalate. In particular, these plasticizers should have a high boiling point, for example above 250° C. at normal pressure. Esters of phthalic acid of alcohols containing 8 to 16 carbon atoms are particularly suitable.

The amount of the ester-based plasticizer should be between 2 to 35%, especially between 5 up to 25 wt. %.

Minor amounts of waxes may optionally be added to the hot melt pressure sensitive adhesive. The amount should be such that it does not negatively influence the adhesion. The wax can be of natural, chemically modified or of synthetic origin. The amount should be less than 10%. In addition, typical auxiliaries and additives may be incorporated in the hot melt pressure sensitive adhesive according to the invention. Examples of these are stabilizers, antioxidants, such as sterically hindered phenols, phosphites or thioesters, colorants such as titanium dioxide, fillers such as talcum, clay, or coupling agents. Such additives or auxiliaries are usually added to the hot melt pressure sensitive adhesive in quantities up to 5 wt. %, preferably in quantities of about 3 wt. %. Such additives are known to the person skilled in the art.

The inventive hot melt pressure sensitive adhesive is manufactured by known methods. For example, optional plasticizers, waxes and resins can be premixed at 120° C. to 180° C. to a homogeneous melt. After having added the auxiliaries and additives, the polymeric components are incorporated and homogenized. Continuous manufacturing methods are also possible, for example in an extruder.

The inventive hot melt pressure sensitive adhesives enable cost effective pressure sensitive to be obtained that meet the requirements of tack, thermal stability under load, application behavior and redetachability. The compatibility of the components is such that the various substrate materials are not negatively affected. The inventive hot melt pressure sensitive adhesives also have a good adhesion at cold temperatures. Quantities of harder polymers such as EVA can also be added as the permanently tacky adhesives to the compositions according to the invention.

The hot melt pressure sensitive adhesives according to the invention are used to bond substrates such as glass, coated or uncoated paper, paperboard packaging and plastics, such as, for example, PET, PEN, PP, PVC and PS. Thin flexible substrates such as films, multi-ply films or paper are then glued to such solid substrates. This concerns for example labels, outer packaging, dockets etc. They can be made for example of plastics, e.g. of polyethylene, polypropylene, polystyrene, polyvinyl chloride or cellophane, especially of polyethylene. Furthermore, however, the labels can also be paper-based, optionally in combination with polymer films. The hot melt pressure sensitive adhesives according to the invention are characterized in particular by very good adhesion to the abovementioned plastics; they can also be detached again from the substrate surfaces.

Another use is for gluing two flexible film substrates together. In this case, both substrate parts are reversibly glued to one another, i.e. bags made of film for example can be resealably glued. This adhesive bond is also stable at low temperature and can be repeatedly sealed.

An application according to the invention is gluing film bags and low-temperature stable gluing of security bags based on polyethylene. In this case one surface of the film is coated with a hot melt pressure sensitive adhesive according to the invention and then glued onto the substrate, for example a paperboard packaging. A good adhesion of the composite is observed even after storage at high temperature; the thermal stability under load is good. The glued film is not changed, i.e. no bubbles, creases or other visual defects are formed. The low temperature tack property of these adhesives is also very good.

EXAMPLES

Example 1

A mixture was prepared from:
10 g EVA polymer (Evatane 28-05)

17 g SBS polymer (Europrene Sol 1205)
55 g resin (Sylvalite RE 105S)
1 g Stabilizer (Irganox 1010)
8 g Plasticizing oil (Primol 352)
9 g DINP (Vestinol 9)

Example 2

A mixture was prepared from:
10 g EVA polymer (Evatane 28-05)
17 g SBS polymer (Europrene Sol 1205)
10 g SIBS (Kraton MD-6455)
41 g resin (Sylvalite RE 105S)
1 g Stabilizer (Irganox 1010)
13 g Plasticizing oil (Primol 352)
10 g DINP (Jayflex DINP)

Example 3

A mixture was prepared from:
10 g EVA polymer (Evatane 28-05)
17 g SBS polymer (Europrene Sol 1205)
5 g SIBS (Kraton MD-6455)
44 g resin (Sylvalite RE 105S)
1 g Stabilizer (Irganox 1010)
3 g Plasticizing oil (Primol 352)
20 g DINP (Jayflex DINP)

Comparative Example 1

A mixture was prepared from:
20 g EVA polymer (Evatane 28-05)
14 g SBS polymer (Europrene Sol 1205)
40 g resin (Sylvares ZT 105 LT)
1 g Stabilizer (Irganox 1010)
25 g Plasticizing oil (Nyflex 222B)

The polymers were melted in a laboratory stirrer at 180° C. and blended. The additional components of the formulation were then added and thoroughly homogenized. The molten mixture was bottled and then cooled, whereupon it solidified.

The hot melt adhesive was then coated with a layer of 18 g/m$^2$ with a heatable doctor knife onto a commercial OPP film and another film made of PE. The films were glued onto cardboard. On stripping, an adhesion force of 11 N/25 mm was obtained.

A coated PE film was glued onto a rigid cardboard base. The sample was stored at 40° C. for 4 days. Creases and swelling were observed for the case of the comparative experiment, otherwise the film remained smoothly glued.

The invention claimed is:

1. A hot melt pressure sensitive adhesive comprising:
 a) 1 to 30 wt. % of at least one ethylene-vinyl acetate copolymer with a melting temperature greater than 70° C.;
 b) 2 to 50 wt. % of a block copolymer that includes a styrene-isoprene-butylene copolymer, in a weight ratio of 10:1 to 1:2 to the total block copolymer, wherein the block copolymer is selected from the group consisting of styrene-butadiene copolymer, styrene-isoprene copolymer, styrene-ethylene/butylene copolymer, styrene-ethylene/propylene-styrene copolymer, styrene-isoprene-butylene copolymer and mixtures thereof,
 c) 20 to 70 wt. % of a tackifying resin; and
 d) 5 to 40 wt. % of a plasticizer which is a mixture of at least one oil and at least one ester;
 wherein the sum of the adhesive components equals to 100% and
 wherein the hot melt pressure sensitive adhesive is characterized as re-detachable.

2. The hot melt pressure sensitive adhesive according to claim 1, wherein the ethylene-vinyl acetate copolymer comprises 10 to 30 mol % vinyl acetate units.

3. The hot melt pressure sensitive adhesive according to claim 1, wherein the ratio of ethylene-vinyl acetate copolymer to the block copolymer is 1:50 to 3:1.

4. The hot melt pressure sensitive adhesive according to claim 1, wherein the oil is a medicinal white oil or a naphthenic oil.

5. The hot melt pressure sensitive adhesive according to claim 1, wherein the ester of adipate or its derivative comprises 2 to 35 wt % based on the total weight of the adhesive.

6. The hot melt pressure sensitive adhesive according to claim 1, further comprising an additive.

7. An article of manufacture comprising the adhesive of claim 1.

8. The article of claim 7 which is a label.

9. The article of claim 7 which is a film.

10. The article of claim 9 which is a flexible film.

11. A hot melt adhesive comprising:
 a) 1 to 30 wt. % of at least one ethylene-vinyl acetate copolymer with a melting temperature greater than 70° C.;
 b) 2 to 50 wt. % of a block copolymer consisting of styrene-butadiene copolymer and styrene-isoprene-butylene copolymer, wherein the weight ratio of styrene-isoprene-butylene copolymer to the total block copolymer is in the range of 10:1 to 1:2;
 c) 20 to 70 wt. % of a tackifying resin; and
 d) 5 to 40 wt. % of a plasticizer which is a mixture of at least one oil and at least one adipate or its derivatives;
 wherein the sum of the adhesive components equals to 100% and
 wherein the adhesive is a redetachable pressure sensitive adhesive.

12. The adhesive according to claim 11, wherein the ethylene-vinyl acetate copolymer comprises 10 to 30 mol % vinyl acetate units.

13. An article of manufacture comprising the adhesive of claim 11.

14. The article of claim 13 which is a film.

15. A redetachable hot melt pressure sensitive adhesive comprising:
 a) 1 to 30 wt. % of at least one ethylene-vinyl acetate copolymer with a melting temperature greater than 70° C.;
 b) 2 to 50 wt. % of styrene-isoprene-butylene copolymer and styrene-butadiene copolymer or styrene-isoprene copolymer, wherein the weight ratio of styrene-isoprene-butylene copolymer to the total styrene copolymer is in the range of 10:1 to 1:2
 c) 20 to 70 wt. % of a tackifying resin; and
 d) 5 to 40 wt. % of a plasticizer which is a mixture of at least one oil and at least one ester;
 wherein the sum of the adhesive components equals to 100%.

* * * * *